(12) United States Patent
Han et al.

(10) Patent No.: US 8,989,093 B2
(45) Date of Patent: Mar. 24, 2015

(54) APPARATUS AND METHOD FOR TRANSMITTING AND RECEIVING SIGNAL IN A NEAR FIELD COMMUNICATION SYSTEM

(71) Applicant: Samsung Electronics Co. Ltd., Suwon-si, Gyeonggi-do (KR)

(72) Inventors: Shuangfeng Han, Suwon-si (KR); Hyun-Kyu Yu, Yongin-si (KR); Su-Ryong Jeong, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 176 days.

(21) Appl. No.: 13/665,424

(22) Filed: Oct. 31, 2012

(65) Prior Publication Data

US 2013/0107831 A1    May 2, 2013

(30) Foreign Application Priority Data

Oct. 28, 2011    (KR) .................. 10-2011-0111298

(51) Int. Cl.
```
H04W 4/00      (2009.01)
H04W 72/00     (2009.01)
H04B 7/26      (2006.01)
H04W 74/02     (2009.01)
H04W 8/00      (2009.01)
H04W 72/12     (2009.01)
```

(52) U.S. Cl.
CPC ............. *H04W 72/00* (2013.01); *H04B 7/2656* (2013.01); *H04W 74/02* (2013.01); *H04W 8/005* (2013.01); *H04W 72/12* (2013.01)
USPC .......................................... 370/328; 370/401

(58) Field of Classification Search
USPC .................. 370/328, 329, 338, 401, 465
See application file for complete search history.

(56) References Cited

U.S. PATENT DOCUMENTS

| 7,136,680 B2 * | 11/2006 | Leizerovich et al. ......... 455/574 |
| 2004/0071090 A1 * | 4/2004 | Corson et al. ................. 370/244 |

(Continued)

OTHER PUBLICATIONS

M. Scott Corson et al., Toward Proximity—Aware Internetworking, The Internet of Things, IEEE Wireless Communications, pp. 26-33, Dec. 2010, 1536-1284/10.

(Continued)

*Primary Examiner* — Ricky Ngo
*Assistant Examiner* — Christine Ng
(74) *Attorney, Agent, or Firm* — Jefferson IP Law, LLP

(57) ABSTRACT

A method and apparatus for transmitting and receiving a signal in a Near Field Communication (NFC) system are provided, in which a multi-frame is configured and a signal is transmitted in the multi-frame to a reception terminal. The multi-frame includes a discovery region, a paging region, at least two scheduling regions for indicating a plurality of different scheduling algorithms, and a traffic slot region. A transmission terminal transmits a signal for searching for a neighbor terminal in the discovery region, transmits a paging signal in the paging region, transmits information for a scheduling algorithm that is predetermined by the transmission terminal and the reception terminal in each of the scheduling regions, and transmits a scheduled signal in the traffic slot region according to the predetermined scheduling algorithm.

32 Claims, 10 Drawing Sheets

(56) References Cited

U.S. PATENT DOCUMENTS

| | | | |
|---|---|---|---|
| 2007/0097867 A1* | 5/2007 | Kneckt et al. | 370/236 |
| 2007/0211745 A1* | 9/2007 | Deshpande et al. | 370/432 |
| 2008/0129880 A1* | 6/2008 | Shao et al. | 348/723 |
| 2011/0021235 A1* | 1/2011 | Laroia et al. | 455/522 |
| 2012/0008570 A1* | 1/2012 | Li et al. | 370/329 |

OTHER PUBLICATIONS

Lorenzo Casaccia, Device to Device communication in 3GPP: LTE-direct, May 2011.

Xinzhou Wu et al., FlashLinQ : A Synchronous Distributed Scheduler for Peer-to-Peer Ad Hoc Networks, Forty-Eighth Annual Allerton Conference, Allerton House, UIUC, Illinois, USA, pp. 514-521, Sep. 29-Oct. 1, 2010, 978-1-4244-8214-6/10.

* cited by examiner

APPARATUS AND METHOD FOR TRANSMITTING AND RECEIVING SIGNAL IN A NEAR FIELD COMMUNICATION SYSTEM

PRIORITY

This application claims the benefit under 35 U.S.C. §119(a) of a Korean patent application filed on Oct. 28, 2011 in the Korean Intellectual Property Office and assigned Serial No. 10-2011-0111298. the entire disclosure of which is hereby incorporated by reference.

BACKGROUND OF THE INVENTION

1. Field of the Invention

The present invention relates to a communication system. More particularly, the present invention relates to an apparatus and method for transmitting and receiving a signal in a Near Field Communication (NFC) system in which communication is conducted directly between devices.

2. Description of the Related Art

Radio communication between devices in close proximity may be conducted by using Near Field Communication (NFC). Device to Device (D2D) communication or ad-hoc communication, which is characterized by direct communication between devices without intervention or use of a relay, is a kind of NFC.

Along with the recent rapid growth of data services and smartphones, D2D communication or ad-hoc communication is under active study. D2D communication enables deployment of new services due to its advantages of reduced battery consumption, an increased bit rate, and robustness against infrastructure failures. Accordingly, D2D communication has emerged as a promising technology for future-generation communication systems.

However, in D2D communication, different scheduling schemes should be used according to a target performance in a communication system. In order to implement different scheduling schemes, information for each scheduling scheme is used. However, there is no specified frame structure that supports implementation of different scheduling schemes, and, thus, applying a plurality of scheduling schemes is difficult.

Therefore, a need exists for a system and method for an apparatus and method for transmitting and receiving a signal in an NFC system in which communication is conducted directly between devices.

SUMMARY OF THE INVENTION

Aspects of the present invention are to address at least the above-mentioned problems and/or disadvantages and to provide at least the advantages described below. Accordingly, an aspect of the present invention is to provide an apparatus and method for generating a frame that supports a plurality of scheduling schemes and transmitting and receiving a signal in the frame in a Near Field Communication (NFC) system.

In accordance with an aspect of the present invention, a signal transmission method of a transmission terminal in an NFC system, in which a multi-frame is configured and a signal is transmitted in the multi-frame to a reception terminal is provided. The multi-frame includes a discovery region, a paging region, at least two scheduling regions for indicating a plurality of different scheduling algorithms, and a traffic slot region. The transmission terminal transmits a signal for searching for a neighbor terminal in the discovery region, transmits a paging signal in the paging region, transmits information for a scheduling algorithm that is predetermined by the transmission terminal and the reception terminal in each of the scheduling regions, and transmits a scheduled signal in the traffic slot region according to the predetermined scheduling algorithm.

In accordance with another aspect of the present invention, a signal reception method of a reception terminal in an NFC system, in which a signal is received in a multi-frame from a transmission terminal and decoded, is provided. The multi-frame includes a discovery region, a paging region, at least two scheduling regions for indicating a plurality of different scheduling algorithms, and a traffic slot region. The reception terminal receives a signal according to which the transmission signal searches for a neighbor terminal in the discovery region, receives a paging signal in the paging region, receives information for a scheduling algorithm that is predetermined by the transmission terminal and the reception terminal in each of the scheduling regions, and receives a scheduled signal in the traffic slot region according to the predetermined scheduling algorithm.

In accordance with another aspect of the present invention, a transmission terminal for transmitting a signal in an NFC system, in which a frame configurer configures a multi-frame, a transmitter transmits a signal in the multi-frame to a reception terminal, and a receiver is provided. The multi-frame includes a discovery region, a paging region, at least two scheduling regions for indicating a plurality of different scheduling algorithms, and a traffic slot region. The transmitter transmits a signal for searching for a neighbor terminal of the transmission terminal in the discovery region, transmits a paging signal in the paging region, transmits information for a scheduling algorithm predetermined by the transmission terminal and the reception terminal in each of the scheduling regions, and transmits a scheduled signal in the traffic slot region according to the predetermined scheduling algorithm.

In accordance with another aspect of the present invention, a reception terminal for receiving a signal in an NFC system, in which a transmitter is included, a receiver receives a signal in a multi-frame from a transmission terminal, and a frame decoder decodes the signal received in the multi-frame are provided. The multi-frame includes a discovery region, a paging region, at least two scheduling regions for indicating a plurality of different scheduling algorithms, and a traffic slot region. The receiver receives a signal according to which the transmission signal searches for a neighbor terminal in the discovery region, receives a paging signal in the paging region, receives information for a scheduling algorithm predetermined by both the transmission terminal and reception terminal in each of the scheduling regions, and receives a scheduled signal in the traffic slot region according to the predetermined scheduling algorithm.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, like reference numerals will be understood to refer to like parts, components, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

For the sake of convenience of description, when communication is conducted directly between terminals, a terminal serving as a reception end will be referred to as a Reception (Rx) terminal and a terminal serving as a transmission end will be referred to as a Transmission (Tx) terminal Each of the Tx and Rx terminals may include both a transmitter and a receiver. Also, FlashLinQ is a major Device to Device (D2D) communication technology used in Near Field Communication (NFC) networks. A FlashLinQ frame will be described below.

Figure 1A:
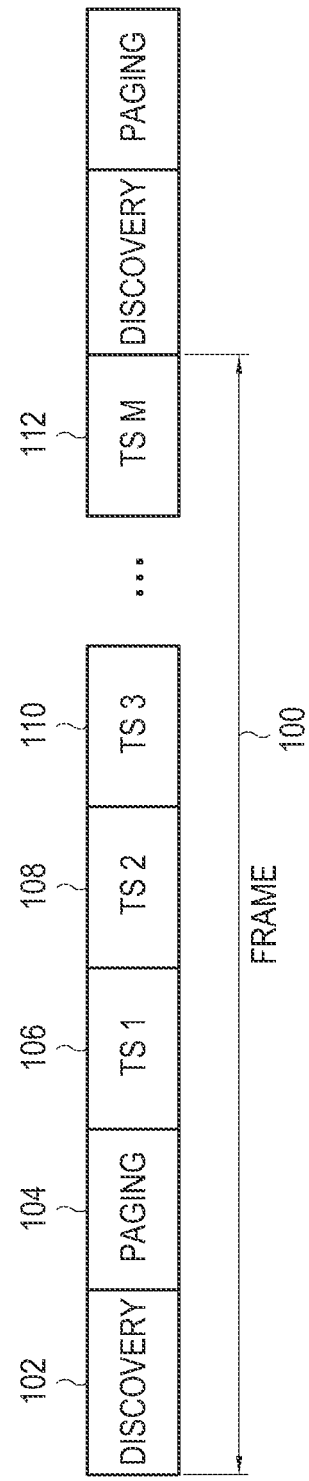
FIG. 1A illustrates a structure of a FlashLinQ frame according to the related art.

FIG. 1A illustrates a structure of a FlashLinQ frame according to the related art.

Referring to FIG. 1A, a frame 100 includes a discovery region 102, a paging region 104, and first to Mth Traffic Slots (TSs) 106 to 112, which are labeled as TS 1 to TS M. Each terminal acquires time synchronization and discovers a neighbor terminal using the discovery region 102. In the paging region, a Tx terminal acquires a logical channel IDentifier (ID) by transmitting a signal indicating an upcoming communication, for example, a paging signal, to an Rx terminal. The Tx/Rx terminal is then scheduled for a logical channel and actual data is transmitted in the TSs 106 to 112.

Figure 1B:
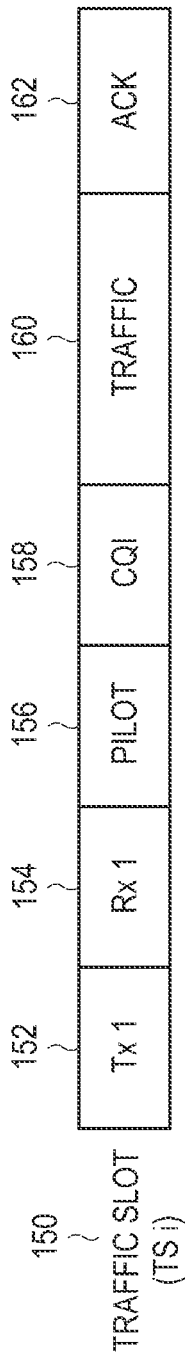
FIG. 1B illustrates a structure of a traffic slot in the FlashLinQ frame according to the related art.

FIG. 1B illustrates a structure of a TS in a FlashLinQ frame according to the related art.

Referring to FIG. 1B, one of the TSs included in the frame 100, TS i is illustrated by way of example. A TS 150, which is labeled as TS i, includes a first Tx (Tx 1) block 152, a first Rx (Rx 1) block 154, a pilot block 156 and a Channel Quality Information (CQI) block 158 for rate scheduling, a traffic block 160, and a traffic ACKnowledgment (ACK) block 162.

A Tx terminal may use the Tx 1 block 152 in order to request scheduling by an Rx terminal. The Rx terminal may determine whether to respond to the scheduling request and may transmit the response to the Tx terminal in the Rx 1 block 154.

FlashLinQ, by having the above-described frame structure, may provide fairness between links due to use of round robin scheduling. However, FlashLinQ may degrade overall system performance because it gives no regard to a channel state of each link. That is, a FlashLinQ Rx terminal considers only a link having the highest priority level when determining whether to respond to a scheduling request, and thus, neglects the channel state of the link.

However, an exemplary embodiment of the present invention provides a method for using different scheduling schemes according to target performances, such as fairness, throughput, service quality, or other similar and suitable performance measures, and a method for configuring a frame supporting a plurality of scheduling schemes in a communication system.

Figure 2:
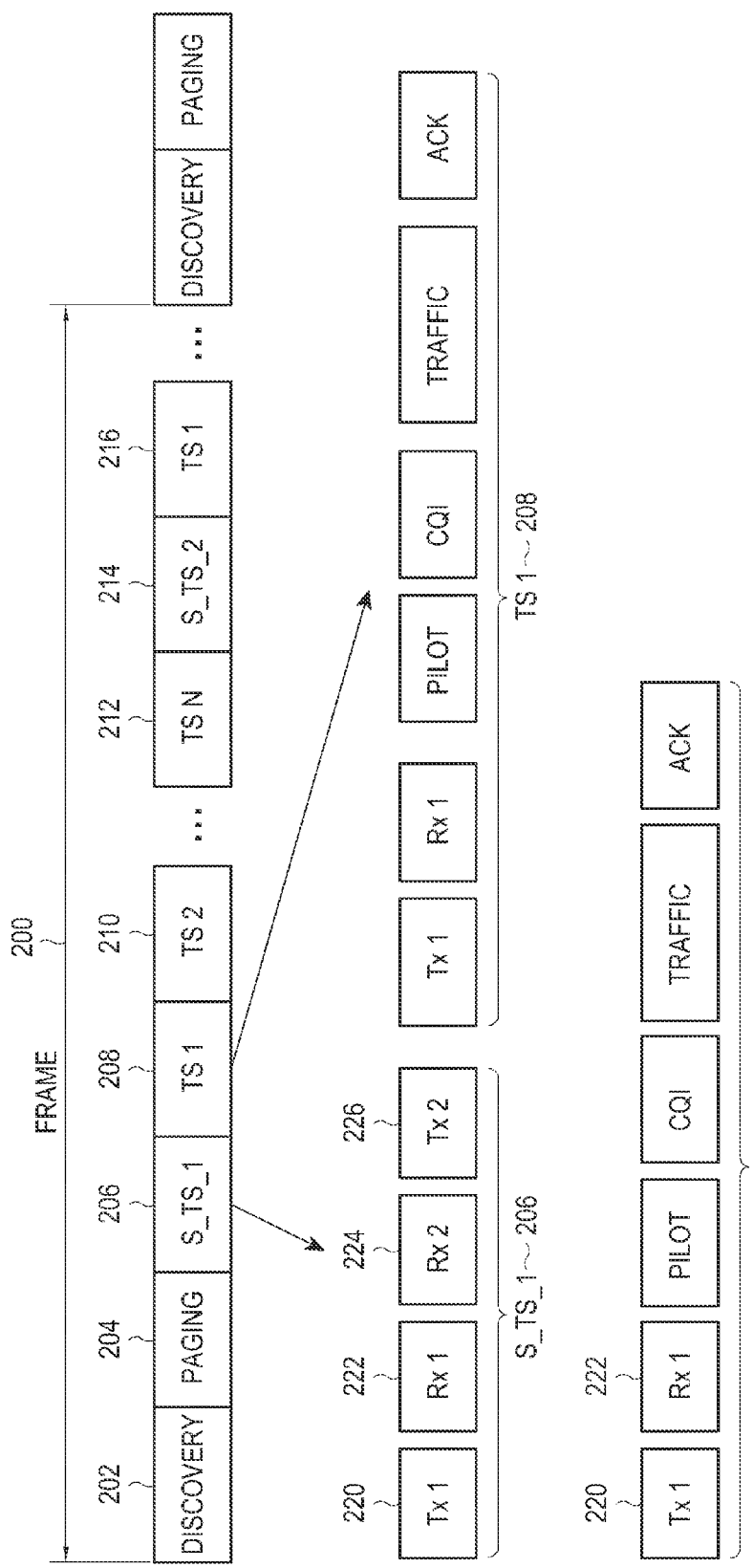
FIG. 2 illustrates a frame structure according to an exemplary embodiment of the present invention.

FIG. 2 illustrates a frame structure according to an exemplary embodiment of the present invention.

Referring to FIG. 2, a frame 200 includes a discovery region 202, a paging region 204, a first scheduling region 206, which may be referred to as Scheduling_TimeSlot_1 or S_TS_1 206, first to Nth TSs 208 to 212, which may be referred to as TS 1 to TS N 208 to 212, a second scheduling region 214, which may be referred to as S_TS_2 214, and an additional N TSs (not all shown) including a first TS 216. Information used for a predetermined scheduling algorithm is exchanged between a Tx terminal and an Rx terminal in the first scheduling region 206. Information used for another predetermined scheduling algorithm is also exchanged between the Tx terminal and the Rx terminal in the second scheduling region 214. While two scheduling regions are shown in FIG. 2, exemplary embodiments of the present invention are not limited thereto, and more scheduling regions may be defined. In addition, the scheduling algorithm indicated by the first scheduling region 206 may be applied to the first to Nth TSs 208 to 212, while the scheduling algorithm indicated by the second scheduling region 216 may be applied to the N TSs including the first TS 216.

The scheduling region 214 is shown in FIG. 2, and is repeated every N TSs, while N may be any positive integer. For instance, if N is 1. a scheduling region exists in a one-to-one correspondence to a TS. The scheduling algorithm indicated by each scheduling region may be round robin scheduling, Proportional Fairness (PF) scheduling, random priority scheduling, Quality of Service (QoS) scheduling, or any other suitable and/or similar type of scheduling. The scheduling algorithm may be preset, i.e., predetermined, or may be broadcast at a time of a transmission and/or reception. If the scheduling algorithm is broadcast, then it is assumed that the broadcasting occurs during a specific slot before a TS or during synchronization. Each TS may occupy a plurality of tones, that is, time and frequency resources defined as K symbols by L subcarriers. Each communication link has one link ID and each link ID is mapped to one of the plurality of tones.

The first scheduling region 206 includes a Tx 1 block 220, an Rx 1 block 222, an Rx 2 block 224, and a Tx 2 block 226. The Tx terminal transmits a reference signal at a given power level, for example, at a maximum power level Pmax, in the Tx 1 block 220 and the Rx terminal also transmits a reference signal at the maximum power level Pmax in the Rx 1 block 222. In addition, the Rx terminal transmits a reference signal at a power level Pmax-Δ in the Rx 2 block 224 and the Tx terminal also transmits a reference signal at the power level Pmax-Δ in the Tx 2 block 226. Δ represents a quantization level of information indicating a predetermined scheduling algorithm, for example, the quantization level of scheduling algorithm information mapped to round robin scheduling, PF scheduling, random priority scheduling, or QoS scheduling. Δ may be calculated by Δ=a*log(information), wherein "a" is an integer known by both the Tx terminal and the Rx terminal, and "information" refers to the scheduling algorithm information.

That is, the Tx terminal may transmit a reference signal to the Rx terminal in the Tx 1 block 220. Thus, the Rx terminal acquires information about a link between the Tx terminal and the Rx terminal, and determines an amount of interference from the Tx terminal, using the reference signal. The Rx terminal transmits a reference signal to the Tx terminal in the Rx 1 block 222 and the Tx terminal determines an amount of interference from the Rx terminal using the received reference signal.

Subsequently, the Rx terminal may feed back information used for the predetermined scheduling scheme to the Tx terminal in the Rx 2 block 224. The information used for the predetermined scheduling scheme may be the quantization level of the scheduling algorithm information, Δ. While FIGS. 3 to 8 will be described in the context of a scheduling scheme that is predetermined, as shown above, the scheduling scheme may be broadcast in a slot occurring before a TS or during synchronization. The Tx terminal feeds the information used for the predetermined scheduling scheme forward to the Rx terminal in the Tx 2 block 226.

The Tx/Rx terminal is scheduled according to the scheduling algorithm information indicated by the information exchanged in the first scheduling region 206 in each of the first to Nth TSs 208 to 212. Each of the first and ith TSs 208 and 218 have the same configuration as the TS 150 illustrated in FIG. 1B, and a detailed description thereof is not provided herein.

Figure 3:
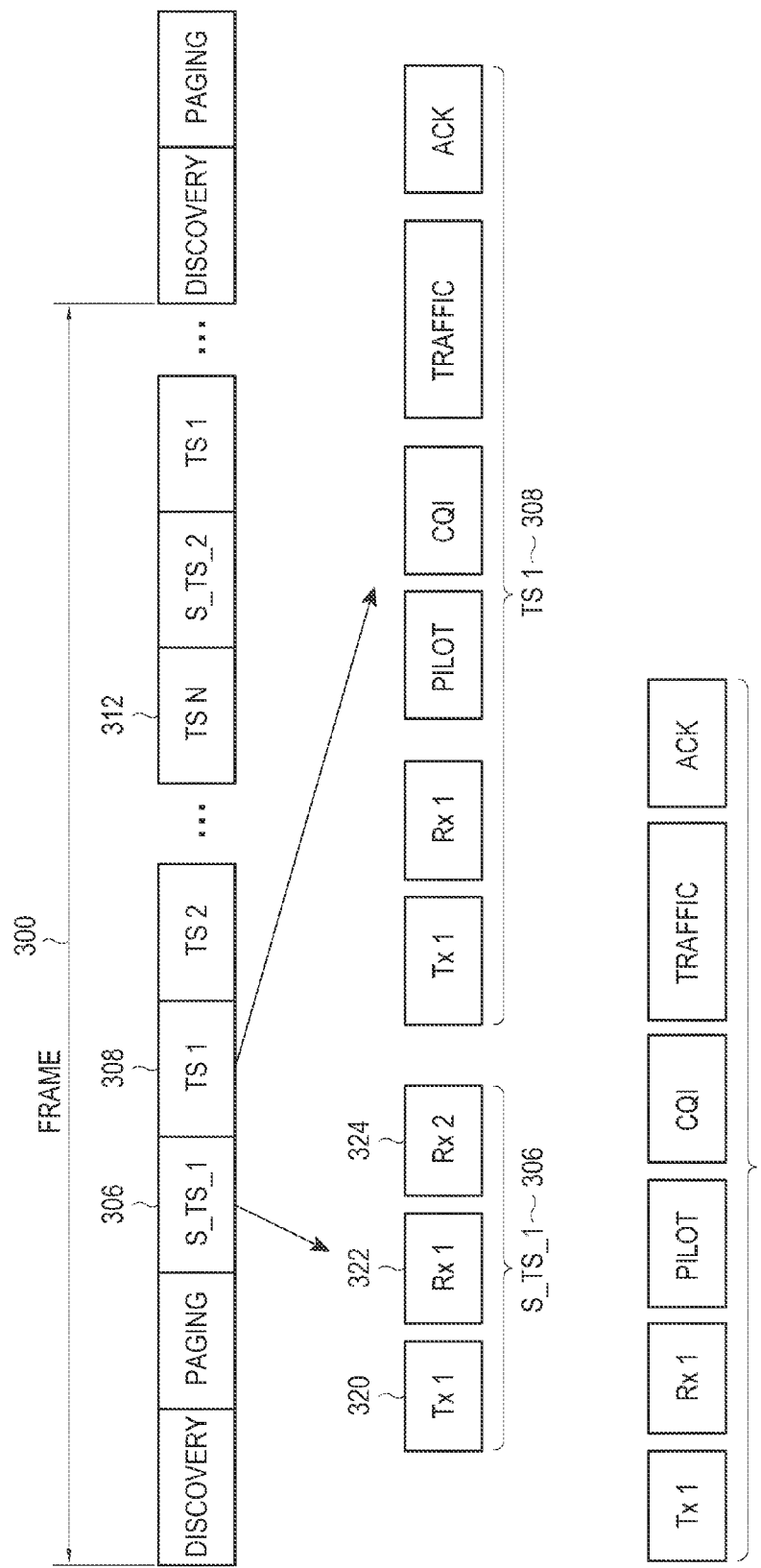
FIG. 3 illustrates a frame structure according to another exemplary embodiment of the present invention.

FIG. 3 illustrates a frame structure according to another exemplary embodiment of the present invention.

Referring to FIG. 3, a frame 300 is configured according to the same structure as the frame 200 illustrated in FIG. 2. A first scheduling region S_TS_1 306 includes a Tx 1 block 320, an Rx 1 block 322, and an Rx 2 block 324. The Tx terminal transmits a reference signal with a predetermined power level, for example, the maximum power level Pmax, in the Tx 1 block 320 and the Rx terminal also transmits a reference signal at the maximum power level Pmax in the Rx 1 block 322. In addition, the Rx terminal transmits a reference signal at the power level Pmax-Δ in the Rx 2 block 324. Δ represents the quantization level of scheduling algorithm information mapped to a predetermined scheduling algorithm. Δ may be calculated by Δ=a*log(information) where "a" is an integer known by both the Tx terminal and the Rx terminal and "information" refers to the scheduling algorithm information.

That is, the Tx terminal may transmit a reference signal to the Rx terminal in the Tx 1 block 320. Thus, the Rx terminal may acquire information about the link between the Tx terminal and the Rx terminal and may determine interference from the Tx terminal, using the reference signal. The Rx terminal may transmit a reference signal to the Tx terminal in the Rx 1 block 322 and the Tx terminal may determine interference from the Rx terminal using the received reference signal.

Subsequently, the Rx terminal may feed back information used for the predetermined scheduling scheme to the Tx terminal in the Rx 2 block 324. The information used for the predetermined scheduling scheme may be the quantization level of the scheduling algorithm information, Δ. Subsequently, at least one of the Tx terminal and the Rx terminal is scheduled according to scheduling algorithm information indicated by the information exchanged in the first scheduling region 306 in each of the first to Nth TSs 308 to 312.

Figure 4:
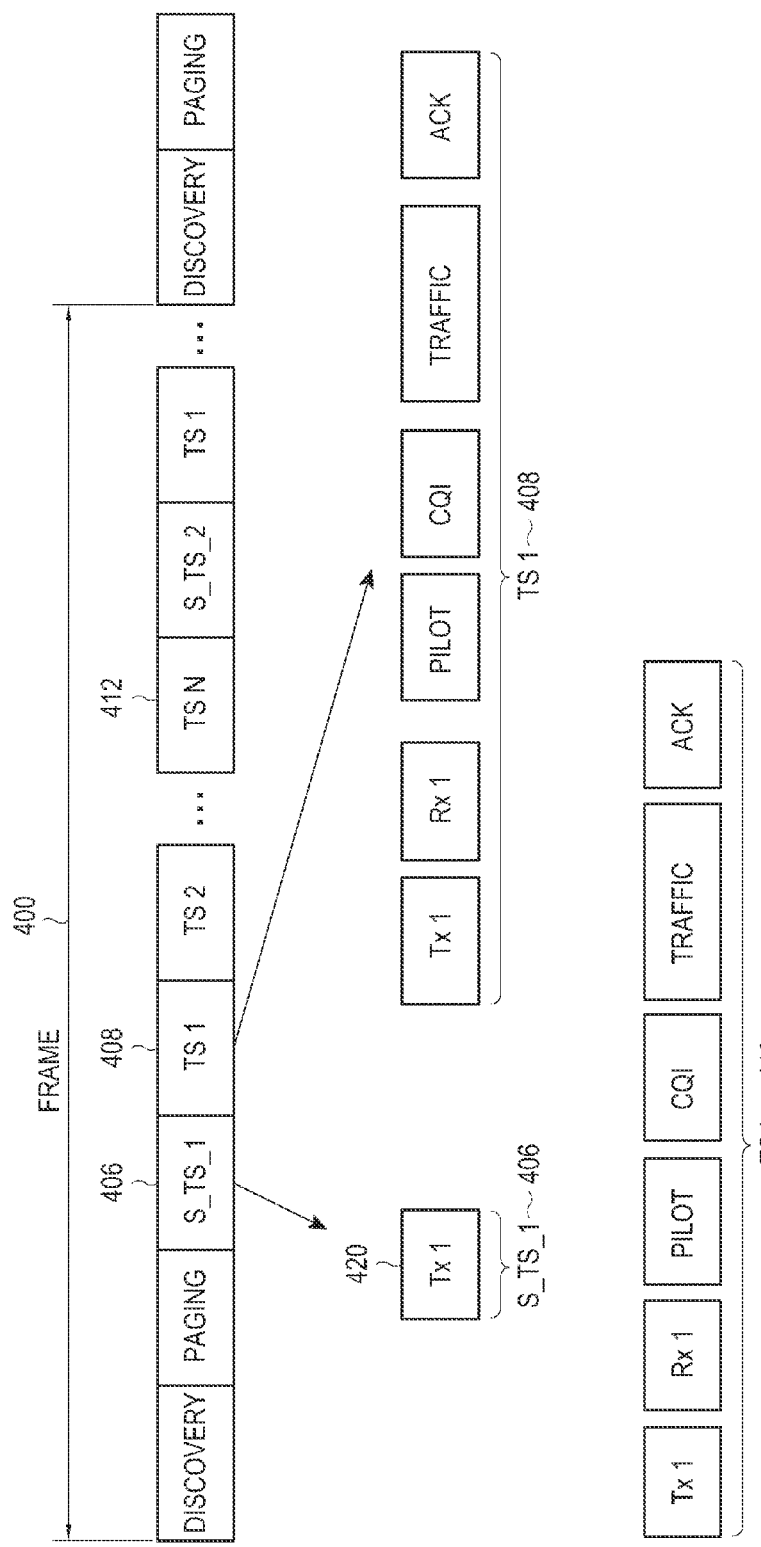
FIG. 4 illustrates a frame structure according to another exemplary embodiment of the present invention.

FIG. 4 illustrates a frame structure according to another exemplary embodiment of the present invention.

Referring to FIG. 4, a frame 400 is configured in the same manner as the frame 200 illustrated in FIG. 2. A first scheduling region S_TS_1 406 includes a Tx 1 block 420. The Tx terminal transmits a reference signal with a predetermined power level, for example, the maximum power level Pmax in the Tx 1 block 420. That is, the Tx terminal may transmit a reference signal to the Rx terminal in the Tx 1 block 420. Thus, the Rx terminal may acquire information about the link between the Tx terminal and the Rx terminal, and may determine an amount of interference from the Tx terminal, using the reference signal. The Rx terminal of the present exemplary embodiment of FIG. 4 does not feedback information used for a predetermined scheduling scheme, unlike the Rx terminal operating in the manner illustrated in FIG. 3.

Figure 5:
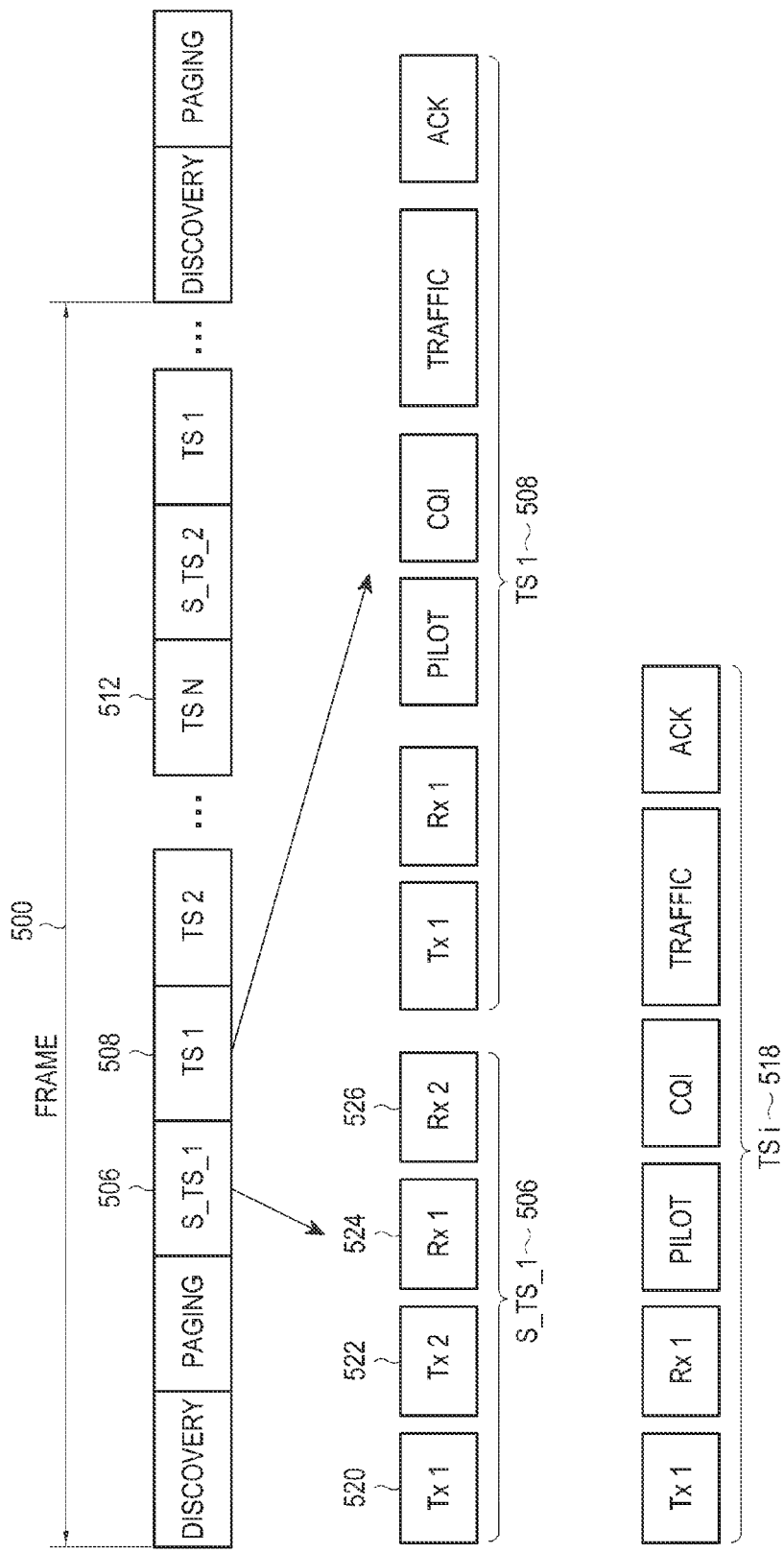
FIG. 5 illustrates a frame structure according to another exemplary embodiment of the present invention.

FIG. 5 illustrates a frame structure according to another exemplary embodiment of the present invention.

Referring to FIG. 5, a frame 500 is configured according to the same structure as the frame 200 illustrated in FIG. 2. A first scheduling region S_TS_1 506 includes a Tx 1 block 520, a Tx 2 block 522, an Rx 1 block 524, and an Rx 2 block 526. The Tx terminal may transmit a reference signal with a predetermined power level, for example, the maximum power level Pmax, in the Tx 1 block 520 and a reference signal, at the power level Pmax-Δ, in the Tx 2 block 522. The Rx terminal also may transmit a reference signal at the maximum power level Pmax in the Rx 1 block 524 and a reference signal at the power level Pmax-Δ in the Rx 2 block 526. Δ represents the quantization level of information indicating a predetermined scheduling algorithm, that is, the quantization level of scheduling algorithm information mapped to the predetermined scheduling scheme. Δ may be calculated by Δ=a*log(information), wherein "a" is an integer known to both the Tx terminal and the Rx terminal and "information" refers to the scheduling algorithm information.

That is, the Tx terminal may transmit a reference signal to the Rx terminal in the Tx 1 block 520. Thus, the Rx terminal may acquire information about the link between the Tx terminal and the Rx terminal and may determine interference from the Tx terminal, using the reference signal. The Tx terminal also may transmit information used for the predetermined scheduling scheme to the Rx terminal in the Tx 2 block 522.

The Rx terminal may transmit a reference signal to the Tx terminal in the Rx 1 block 524. Thus, the Tx terminal may determine an amount interference from the Rx terminal, using the reference signal. The Rx terminal also may feed back the information used for the predetermined scheduling scheme to the Tx terminal in the Rx 2 block 526. The information used for the predetermined scheduling scheme may be the quantization level of the scheduling algorithm information, Δ. Subsequently, at least one of the Tx terminal and the Rx terminal may be scheduled according to the scheduling algorithm information indicated by the information exchanged in the first scheduling region 506 in each of first to Nth TSs 508 to 512.

Figure 6:
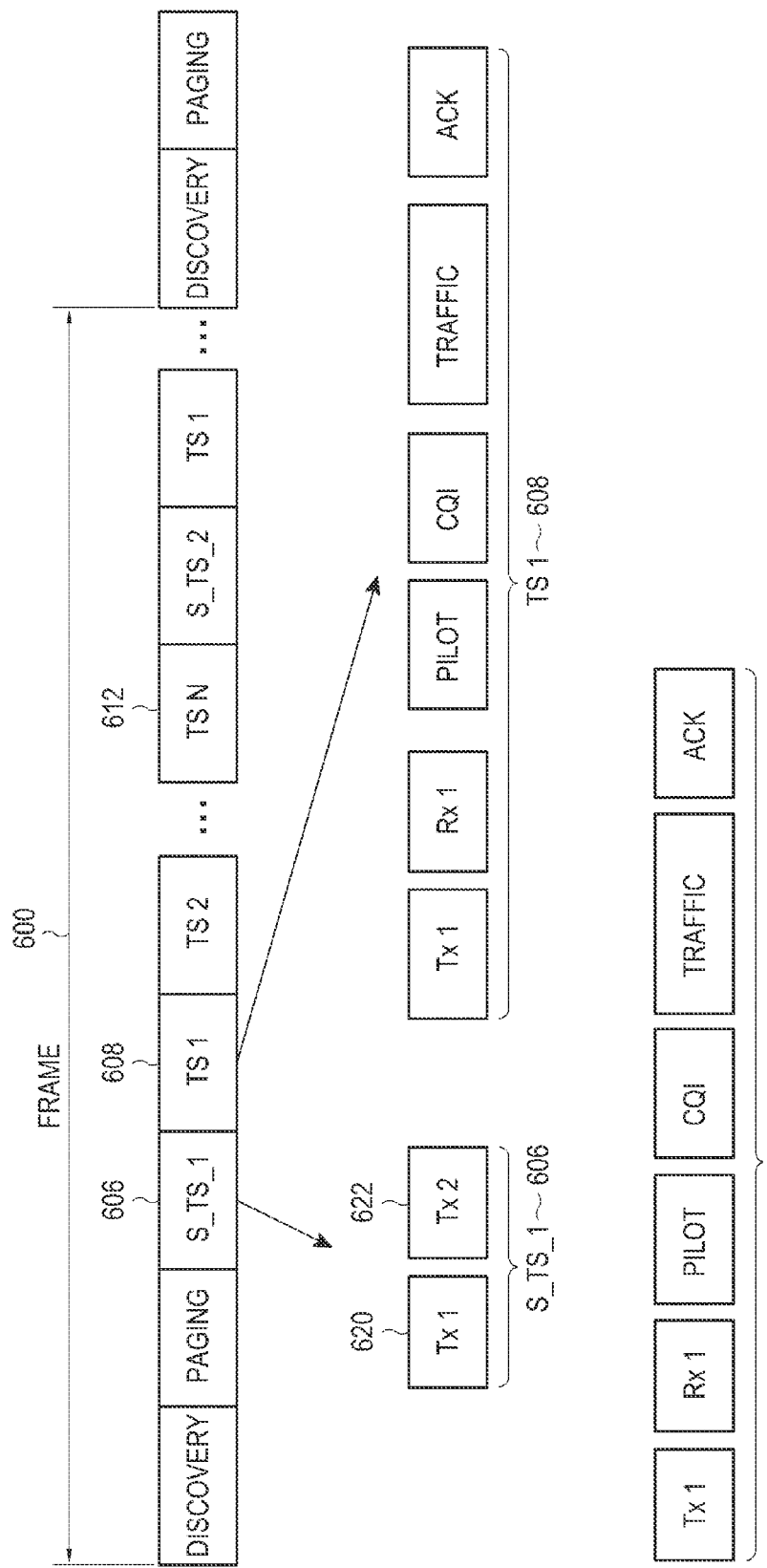
FIG. 6 illustrates a frame structure according to another exemplary embodiment of the present invention.

FIG. 6 illustrates a frame structure according to another exemplary embodiment of the present invention.

Referring to FIG. 6, a frame 600 has the same structure as the frame 200 illustrated in FIG. 2. A first scheduling region S_TS_1 606 includes a Tx 1 block 620 and a Tx 2 block 622. The Tx terminal transmits a reference signal with a predetermined power level, for example, the maximum power level Pmax, in the Tx 1 block 620 and a reference signal, at the power level Pmax-Δ, in the Tx 2 block 622. Δ represents the quantization level of information indicating a predetermined scheduling algorithm, that is, the quantization level of scheduling algorithm information mapped to the predetermined scheduling scheme. Δ may be calculated by Δ=a*log(information) where "a" is an integer known by both the transmitting and receiving terminals and "information" refers to the scheduling algorithm information.

That is, the Tx terminal may transmit a reference signal to the Rx terminal in the Tx 1 block 620. Thus, the Rx terminal may acquire information about the link between the Tx terminal and the Rx terminal and may determine an amount of interference from the Tx terminal, using the reference signal. The Tx terminal also may transmit information used for the predetermined scheduling scheme to the Rx terminal in the Tx 2 block 622. Compared to the Rx terminal described with reference to FIG. 5, the Rx terminal of the present exemplary embodiment of FIG. 6 does not feed back the information used for the predetermined scheduling scheme to the Tx terminal. The information used for the predetermined scheduling scheme may be the quantization level of the scheduling algorithm information, Δ. Subsequently, the Tx/Rx terminal is scheduled according to the scheduling algorithm information indicated by the information exchanged in the first scheduling region 606 in each of first to Nth TSs 608 to 612.

Figure 7:
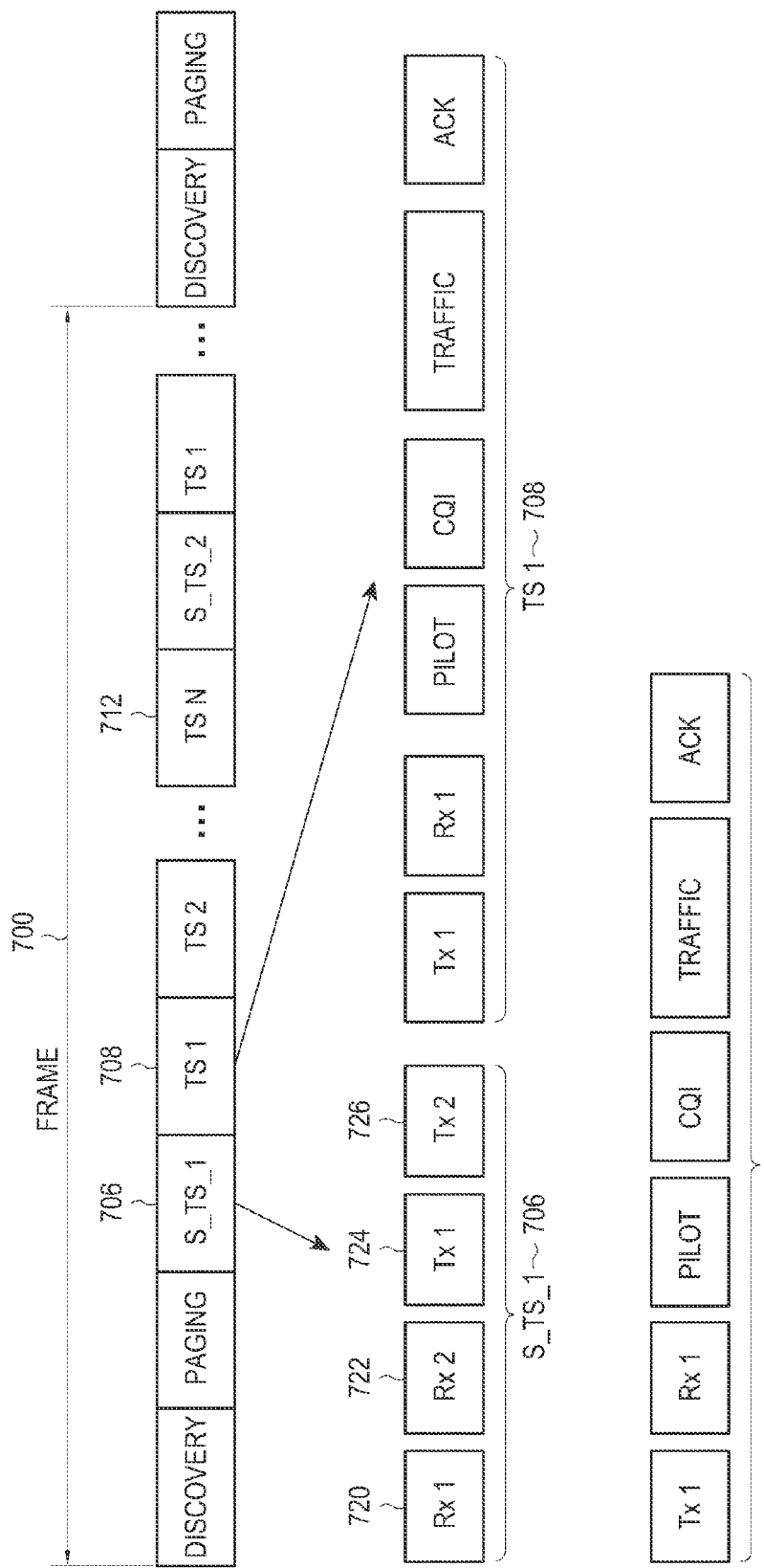
FIG. 7 illustrates a frame structure according to another exemplary embodiment of the present invention.

FIG. 7 illustrates a frame structure according to another exemplary embodiment of the present invention.

Referring to FIG. 7, a frame 700 is configured in the same manner as the frame 200 illustrated in FIG. 2. A first scheduling region S_TS_1 706 includes an Rx 1 block 720, an Rx 2 block 722, a Tx 1 block 724, and a Tx 2 block 726. The Rx terminal may transmit a reference signal at the maximum power level Pmax in the Rx 1 block 720 and a reference signal at the power level Pmax-Δ in the Rx 2 block 722. The Tx terminal may transmit a reference signal with a predetermined power level, for example, the maximum power level Pmax, in the Tx 1 block 720 and a reference signal, at the power level Pmax-Δ, in the Tx 2 block 726. Δ represents the quantization level of information indicating a predetermined scheduling algorithm, that is, the quantization level of scheduling algorithm information mapped to the predetermined scheduling scheme. Δ may be calculated by Δ=a*log(information), wherein "a" is an integer known to both the Tx terminal and the Rx terminal and "information" refers to the scheduling algorithm information.

That is, the Rx terminal may transmit a reference signal to the Tx terminal in the Rx 1 block 720. Thus, the Tx terminal may determine an amount of interference from the Rx terminal, using the reference signal. The Rx terminal also may transmit information used for the predetermined scheduling scheme to the Tx terminal in the Rx 2 block 722.

The Tx terminal transmits a reference signal to the Rx terminal in the Tx 1 block 724 so that the Rx terminal may acquire information about the link between them and may determine an amount of interference from the Tx terminal using the received reference signal. In addition, the Tx terminal may feed the information used for the predetermined scheduling scheme forward to the Rx terminal in the Tx 2 block 726. The information used for the predetermined scheduling scheme may be Δ. Subsequently, at least one of the Tx terminal and the Rx terminal may be scheduled according to the scheduling algorithm information indicated by the information exchanged in the first scheduling region 706 in each of first to Nth TSs 708 to 712.

Figure 8:
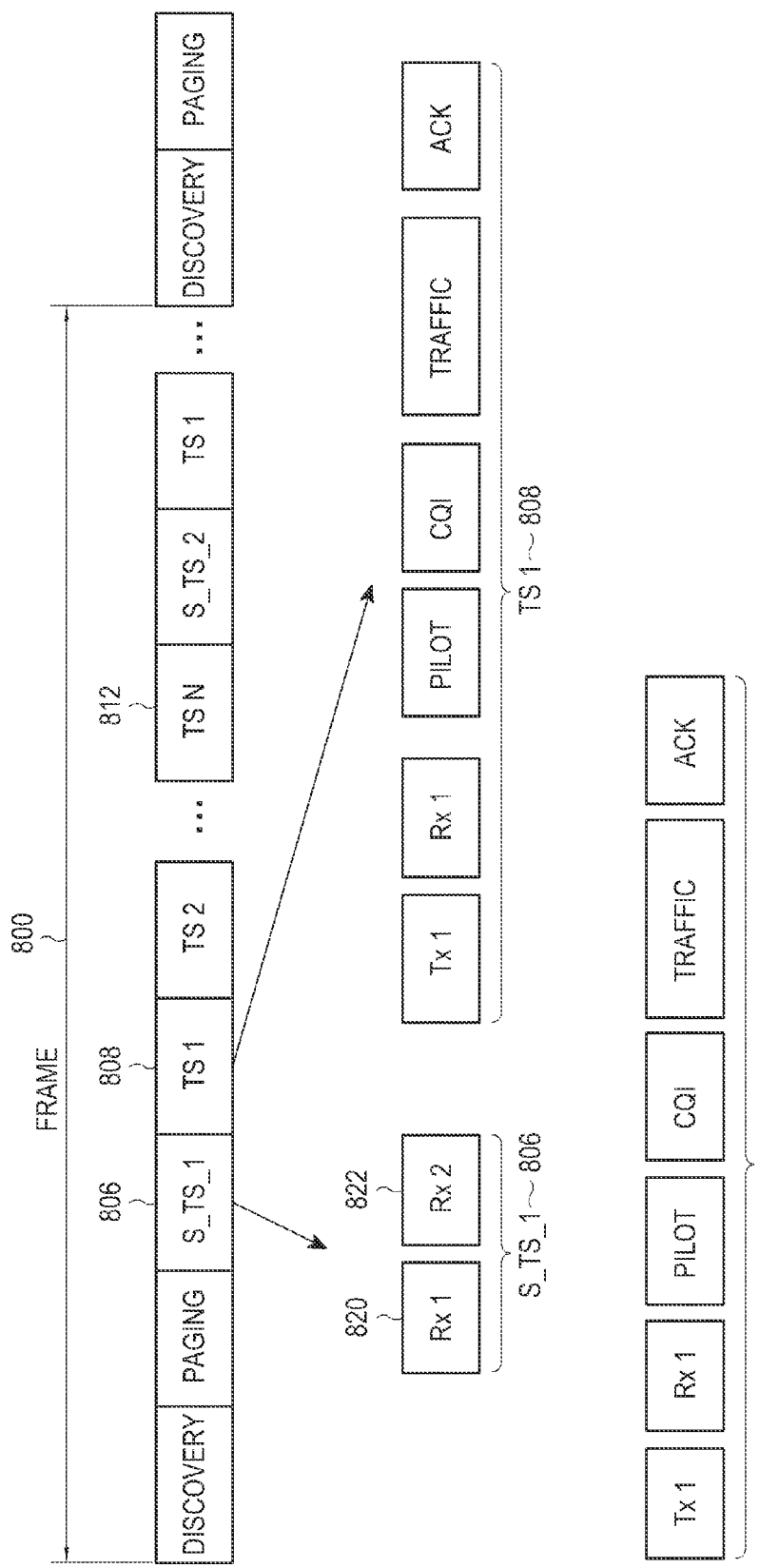
FIG. 8 illustrates a frame structure according to a further exemplary embodiment of the present invention.

FIG. 8 illustrates a frame structure according to a further exemplary embodiment of the present invention.

Referring to FIG. 8, a frame 800 is configured in the same manner as the frame 200 illustrated in FIG. 2. A first scheduling region S_TS_1 806 includes an Rx 1 block 820 and an Rx 2 block 822. The Rx terminal may transmit a reference signal at the maximum power level Pmax in the Rx 1 block 820 and a reference signal at the power level Pmax-Δ in the Rx 2 block 822. Δ represents the quantization level of information indicating a predetermined scheduling algorithm, that is, the quantization level of scheduling algorithm information mapped to the predetermined scheduling algorithm. It may be calculated by Δ=a*log(information) wherein "a" is an integer known to both the Tx terminal and the Rx terminal and "information" refers to the scheduling algorithm information.

That is, the Rx terminal may transmit a reference signal to the Tx terminal in the Rx 1 block 820. Thus, the Tx terminal may determine an amount of interference from the Rx terminal, using the reference signal. The Rx terminal also may transmit information used for the predetermined scheduling scheme to the Tx terminal in the Rx 2 block 822. Unlike the Tx terminal illustrated in FIG. 7, the Tx terminal of the present exemplary embodiment of FIG. 8 does not feed the information used for the predetermined scheduling scheme forward to the Rx terminal The information used for the predetermined scheduling scheme may be the quantization level of the scheduling algorithm information, Δ. Subsequently, at least one of the Tx terminal and the Rx terminal is scheduled according to the scheduling algorithm information indicated by the information exchanged in the first scheduling region 806 in each of first to Nth TSs 808 to 812.

Figure 9:
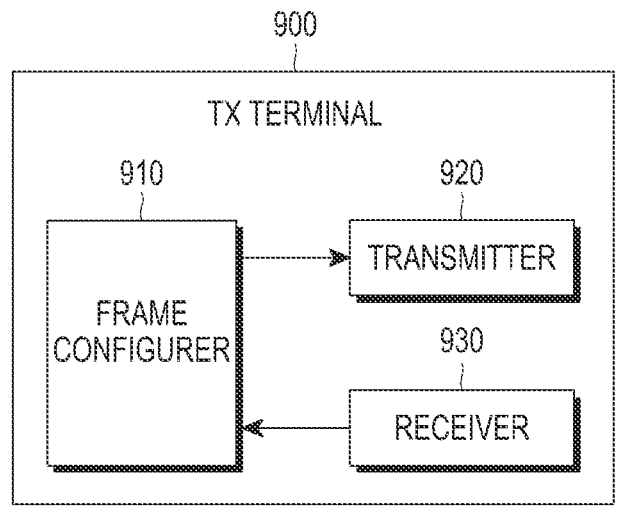
FIG. 9 is a block diagram of a transmission terminal according to an exemplary embodiment of the present invention.

FIG. 9 is a block diagram of the Tx terminal according to an exemplary embodiment of the present invention.

Referring to FIG. 9, a Tx terminal 900 includes a frame configurer 910, a transmitter 920, and a receiver 930.

The Tx terminal 900 configures a multi-frame in the manner described with respect to FIGS. 2 to 8 at the frame configurer 910 and transmits a signal in the multi-frame through the transmitter 920. In addition, the Tx terminal 900 receives a reference signal and information used for a scheduling algorithm from an Rx terminal through the receiver 930, for use in configuring a scheduling region for the multi-frame.

Figure 10:
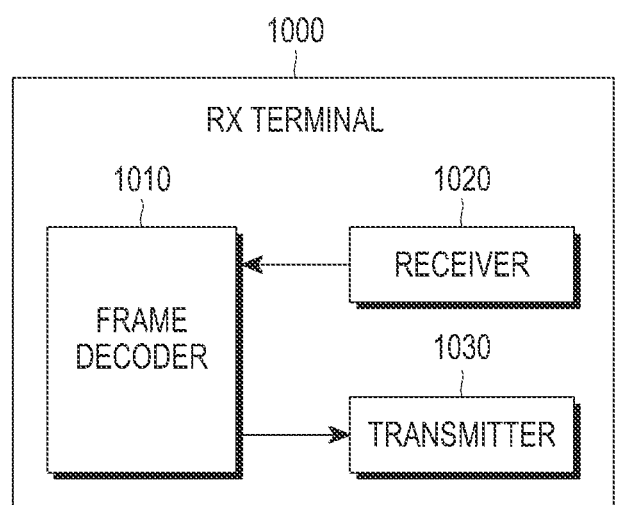
FIG. 10 is a block diagram of a reception terminal according to an exemplary embodiment of the present invention.

FIG. 10 is a block diagram of the Rx terminal according to an exemplary embodiment of the present invention.

Referring to FIG. 10, an Rx terminal 1000 includes a frame decoder 1010, a receiver 1020, and a transmitter 1030.

The receiving terminal 1000 receives a signal in a multi-frame from a transmitting terminal through the receiver 1020. The frame decoder 1010 decodes the received multi-frame signal. In addition, the Rx terminal 1000 transmits a reference signal and information used for a scheduling algorithm to the Tx terminal through the transmitter 1030, for use in configuring a scheduling region for the multi-frame.

As is apparent from the above description of the present exemplary embodiments, the present exemplary embodiments enable use of different scheduling schemes according to target performances in an NFC system by providing a method for generating a frame supporting a plurality of scheduling schemes and transmitting and receiving a signal in the frame.

While the invention has been shown and described with reference to certain exemplary embodiments thereof, it will be understood by those of skilled in the art that various changes in form and details may be made therein without departing from the spirit and scope of the invention as defined by the appended claims and their equivalents.

What is claimed is:

1. A signal transmission method of a transmission terminal in a communication system, the method comprising:
    transmitting a signal in a multi-frame to a reception terminal,
    wherein the multi-frame includes a discovery region, a paging region, at least two scheduling regions for indicating a plurality of different scheduling algorithms, and a traffic slot region,
    wherein the transmission terminal transmits a signal for searching for a neighbor terminal in the discovery region, transmits a paging signal in the paging region, transmits a signal related to information for a scheduling algorithm that is predetermined in each of the at least two scheduling regions, and transmits a scheduled signal in the traffic slot region based on the information for the scheduling algorithm, and
    wherein the information for the scheduling algorithm comprises a quantization level of the information for the scheduling algorithm.

2. The signal transmission method of claim 1,
    wherein quantization level represents a the delta value $\Delta$ being calculated by, $$\Delta = a * \log(\text{information}),$$

where "a" is an integer known to both the transmission terminal and the reception terminal and "information" is the information for the scheduling algorithm.

3. The signal transmission method of claim 2, wherein each of the at least two scheduling regions includes a first transmission block for transmitting a first reference signal, a first reception block for receiving a second reference signal, a second reception block for feeding back the signal related to the information for the scheduling algorithm, and a second transmission block for feeding forward the signal related to the information for the scheduling algorithm.

4. The signal transmission method of claim 2, wherein each of the at least two scheduling regions includes a first transmission block for transmitting a first reference signal, a first reception block for receiving a second reference signal, and a second reception block for feeding back the signal related to the information for the scheduling algorithm.

5. The signal transmission method of claim 2, wherein each of the at least two scheduling regions includes a first transmission block for transmitting a first reference signal, a second transmission block for transmitting the signal related to the information for the scheduling algorithm, a first reception block for receiving a second reference signal, and a second reception block for feeding back the signal related to the information for the scheduling algorithm.

6. The signal transmission method of claim 2, wherein each of the at least two scheduling regions includes a first transmission block for transmitting a first reference signal, and a second transmission block for transmitting the signal related to the information for the scheduling algorithm.

7. The signal transmission method of claim 2, wherein each of the at least two scheduling regions includes a first reception block for receiving a second reference signal, a second reception block for receiving the signal related to the information for the scheduling algorithm, a first transmission block for transmitting a first reference signal, and a second transmission block for feeding forward the signal related to the information for the scheduling algorithm.

8. The signal transmission method of claim 2, wherein each of the at least two scheduling regions includes a first reception block for receiving a second reference signal and a second reception block for feeding back the signal related to the information for the scheduling algorithm.

9. A signal reception method of a reception terminal in a communication system, the method comprising:
    receiving a signal in a multi-frame from a transmission terminal; and
    decoding the signal received in the multi-frame,
    wherein the multi-frame includes a discovery region, a paging region, at least two scheduling regions for indicating a plurality of different scheduling algorithms, and a traffic slot region,
    wherein the reception terminal receives a signal according to which the transmission signal searches for a neighbor terminal in the discovery region, receives a paging signal in the paging region, receives a signal related to information for a scheduling algorithm that is predetermined in each of the at least two scheduling regions, and receives a scheduled signal in the traffic slot region based on the information for the scheduling algorithm, and
    wherein the information for the scheduling algorithm comprises a quantization level of the information for the scheduling algorithm.

10. The signal reception method of claim 9,
    wherein the quantization level represents a delta value $\Delta$ being calculated by, $$\Delta = a * \log(\text{information}),$$

where "a" is an integer known to both the transmission terminal and the reception terminal and "information" is the information for the scheduling algorithm.

11. The signal reception method of claim 10, wherein each of the at least two scheduling regions includes a first transmission block for transmitting a first reference signal, a first reception block for receiving a second reference signal, a second reception block for feeding back the signal related to the information for the scheduling algorithm, and a second transmission block for feeding forward the signal related to the information for the scheduling algorithm.

12. The signal reception method of claim 10, wherein each of the at least two scheduling regions includes a first transmission block for transmitting a first reference signal, a first reception block for receiving a second reference signal, and a second reception block for feeding back the signal related to the information for the scheduling algorithm.

13. The signal reception method of claim 10, wherein each of the at least two scheduling regions includes a first transmission block for transmitting a first reference signal, a second transmission block for transmitting the signal related to the information for the scheduling algorithm, a first reception block for receiving a second reference signal, and a second reception block for feeding back the signal related to the information for the scheduling algorithm.

14. The signal reception method of claim 10, wherein each of the at least two scheduling regions includes a first transmission block for transmitting a first reference signal, and a second transmission block for transmitting the signal related to the information for the scheduling algorithm.

15. The signal reception method of claim 10, wherein each of the at least two scheduling regions includes a first reception block for receiving a second reference signal, a second reception block for receiving the signal related to the information for the scheduling algorithm, a first transmission block for transmitting a first reference signal, and a second transmission block for feeding forward the signal related to the information for the scheduling algorithm.

16. The signal reception method of claim 10, wherein each of the at least two scheduling regions includes a first reception block for receiving a second reference signal and a second reception block for feeding back the signal related to the information for the scheduling algorithm.

17. A transmission terminal for transmitting a signal in a communication system, the terminal comprising:
a transmitter configured to transmit a signal in a multi-frame to a reception terminal; and
a receiver configured to receive a signal,
wherein the multi-frame includes a discovery region, a paging region, at least two scheduling regions for indicating a plurality of different scheduling algorithms, and a traffic slot region,
wherein the transmitter is further configured to transmit a signal for searching for a neighbor terminal of the transmission terminal in the discovery region, to transmit a paging signal in the paging region, to transmit a signal related to information for a scheduling algorithm predetermined by the transmission terminal and the reception terminal in each of the at least two scheduling regions, and to transmit a scheduled signal in the traffic slot region based on the information for the scheduling algorithm, and
wherein the information for the scheduling algorithm comprises a quantization level of the information for the scheduling algorithm.

18. The transmission terminal of claim 17,
wherein the quantization level represents a delta value Δ being calculated by, $\Delta = a * \log(\text{information})$, where "a" is an integer known to both the transmission terminal and the reception terminal and "information" is the information for the scheduling algorithm.

19. The transmission terminal of claim 18, wherein each of the at least two scheduling regions includes a first transmission block for transmitting a first reference signal, a first reception block for receiving a second reference signal, a second reception block for feeding back the signal related to the information for the scheduling algorithm, and a second transmission block for feeding forward the signal related to the information for the scheduling algorithm.

20. The transmission terminal of claim 18, wherein each of the at least two scheduling regions includes a first transmission block for transmitting a first reference signal, a first reception block for receiving a second reference signal, and a second reception block for feeding back the signal related to the information for the scheduling algorithm.

21. The transmission terminal of claim 18, wherein each of the at least two scheduling regions includes a first transmission block for transmitting a first reference signal, a second transmission block for transmitting the signal related to the information for the scheduling algorithm, a first reception block for receiving a second reference signal, and a second reception block for feeding back the signal related to the information for the scheduling algorithm.

22. The transmission terminal of claim 18, wherein each of the at least two scheduling regions includes a first transmission block for transmitting a first reference signal, and a second transmission block for transmitting the signal related to the information for the scheduling algorithm.

23. The transmission terminal of claim 18, wherein each of the at least two scheduling regions includes a first reception block for receiving a second reference signal, a second reception block for receiving the signal related to the information for the scheduling algorithm, a first transmission block for transmitting a first reference signal, and a second transmission block for feeding forward the signal related to the information for the scheduling algorithm.

24. The transmission terminal of claim 18, wherein each of the at least two scheduling regions includes a first reception block for receiving a second reference signal and a second reception block for feeding back the signal related to the information for the scheduling algorithm.

25. A reception terminal for receiving a signal in a communication system, the terminal comprising:
a transmitter configured to transmit a signal;
a receiver configured to receive a signal in a multi-frame from a transmission terminal; and
a frame decoder configured to decode the signal received in the multi-frame,
wherein the multi-frame includes a discovery region, a paging region, at least two scheduling regions for indicating a plurality of different scheduling algorithms, and a traffic slot region,
wherein the receiver is further configured to receive a signal according to which the transmission signal searches for a neighbor terminal in the discovery region, to receive a paging signal in the paging region, receives a signal related to information for a scheduling algorithm that is predetermined in each of the at least two scheduling regions, and to receive a scheduled signal in the traffic slot region based on the information for the scheduling algorithm, and
wherein the information for the scheduling algorithm comprises a quantization level of the information for the scheduling algorithm.

26. The reception terminal of claim 25,
wherein the quantization level represents a the delta value Δ being calculated by the following equation, $\Delta = a * \log(\text{information})$, where "a" is an integer known to both the transmission terminal and the reception terminal and "information" is the information for the scheduling algorithm.

27. The reception terminal of claim 26, wherein each of the at least two scheduling regions includes a first transmission block for transmitting a first reference signal, a first reception block for receiving a second reference signal, a second reception block for feeding back the signal related to the information for the scheduling algorithm, and a second transmission block for feeding forward the signal related to the information for the scheduling algorithm.

28. The reception terminal of claim 26, wherein each of the at least two scheduling regions includes a first transmission block for transmitting a first reference signal, a first reception block for receiving a second reference signal, and a second reception block for feeding back the signal related to the information for the scheduling algorithm.

29. The reception terminal of claim 26, wherein each of the at least two scheduling regions includes a first transmission block for transmitting a first reference signal, a second transmission block for transmitting the signal related to the information for the scheduling algorithm, a first reception block for receiving a second reference signal, and a second reception block for feeding back the signal related to the information for the scheduling algorithm.

30. The reception terminal of claim 26, wherein each of the at least two scheduling regions includes a first transmission block for transmitting a first reference signal, and a second transmission block for transmitting the signal related to the information for the scheduling algorithm.

31. The reception terminal of claim 26, wherein each of the at least two scheduling regions includes a first reception block for receiving a second reference signal, a second reception block for receiving the signal related to the information for the scheduling algorithm, a first transmission block for transmitting a first reference signal, and a second transmission block for feeding forward the signal related to the information for the scheduling algorithm.

32. The reception terminal of claim 26, wherein each of the at least two scheduling regions includes a first reception block for receiving a second reference signal and a second reception block for feeding back the signal related to the information for the scheduling algorithm.

* * * * *